(12) United States Patent
Bode (10) Patent No.: US 7,970,784 B2
(45) Date of Patent: Jun. 28, 2011

(54) MULTI-LINGUAL INFORMATION DISPLAY IN A SINGLE LANGUAGE PORTAL

(75) Inventor: Andreas Bode, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/123,963

(22) Filed: May 20, 2008

(65) Prior Publication Data

US 2009/0222428 A1 Sep. 3, 2009

Related U.S. Application Data

(60) Provisional application No. 61/032,984, filed on Mar. 2, 2008.

(51) Int. Cl.
*G06F 17/30* (2006.01)

(52) U.S. Cl. ............................................ 707/760; 704/2

(58) Field of Classification Search .................. 707/760, 707/761, 765, 769; 704/2, 277, E19.049, 704/8, 9
See application file for complete search history.

(56) References Cited

U.S. PATENT DOCUMENTS

| 6,999,916 | B2 | 2/2006 | Lin |
| 2002/0064766 | A1 | 5/2002 | Cozens |
| 2004/0044518 | A1 | 3/2004 | Reed, Jr. |
| 2006/0080083 | A1 | 4/2006 | Lin et al. |
| 2006/0136309 | A1 | 6/2006 | Horn |
| 2006/0173886 | A1 | 8/2006 | Moulinier et al. |
| 2007/0179773 | A1 | 8/2007 | Shibutani |
| 2007/0225966 | A1 | 9/2007 | Suen |

FOREIGN PATENT DOCUMENTS

| WO | 0113273 A2 | 2/2001 |
| WO | 2004059521 A1 | 7/2004 |
| WO | WO2004/059521 A1 * | 7/2004 |

OTHER PUBLICATIONS

Luca Bandinelli, "Building Multilingual Solutions by Using SharePoint Products and Technologies", Microsoft Corporation, Nov. 2006, 38 pages. http://dteportal.dat.demokritos.gr/DocLib4/Building%20Multilingual%20Solutions%20by%20Using%20-SharePoint%20Products%20and%20Technologies.doc.

"NTC Rolls-Out Multilingual Mobile Information Portal for Thousands of World Cup Visitors Using the Clickmarks Enterprise Suite", http://findarticles.com/p/articles/mi_pwwi/is_200206/ai_mark01043959, Feb. 26, 2008, 7 pages.

David Kirk Evans, et al., "Columbia Newsblaster: Multilingual News Summarization on the Web", http://acl.ldc.upenn.edu/hlt-naacl2004/demos/pdf/evans.pdf, Department of Computer Science, Columbia University, NY, NY 10027, 4 pages.

Takahashi et al., "Development of an Effective Multilingual Display Engine for Language Learners," Graduate School of Decision Science and Technology, Department of Human System Science, Tokyo Institute of Technology, Apr. 3, 2008, 3 pgs.

PCT Search Report and Written Opinion for PCT Application No. PCT/US2009/033263, mailed Apr. 29, 2009, 12 pgs.

* cited by examiner

*Primary Examiner* — Fred I Ehichioya
(74) *Attorney, Agent, or Firm* — Lee & Hayes, PLLC (57) ABSTRACT

A multi-lingual search and display system and/or methodology. The system providing a single point of access to information in multiple languages by executing a query against a set of targets, where the set of targets can include continents, countries, regions, geographic areas, languages, cultures, economies, markets, and so forth. Additionally, the subject invention translates the resulting documents and renders the translated results in a single view.

20 Claims, 6 Drawing Sheets

MULTI-LINGUAL INFORMATION DISPLAY IN A SINGLE LANGUAGE PORTAL

CROSS REFERENCE TO RELATED APPLICATIONS

This application claims priority to U.S. Provisional Patent Application Ser. No. 61/032,984, filed on Mar. 2, 2008, entitled "MULTI-LINGUAL INFORMATION DISPLAY IN A SINGLE LANGUAGE PORTAL", the entirety of which is incorporated herein by reference.

BACKGROUND OF THE INVENTION

The internet enables global access to information, and has the potential to provide for fascinating insights into the reporting of various cultures and countries on a wide array of subjects. For example, a person with internet access located in Ohio can access news coverage from Italy and Japan without ever leaving their home. Additionally, a company located in a first market can conduct marketing or public relations studies in various other markets.

Currently, in order to access information from other cultures a user must go through the tedious exercise of exploring multiple information portals, or performing multiple searches for specific markets. In many instances, a large portion of the information maintained on the internet is not available in a user's primary language. Therefore, knowledge of multiple languages is required to get an understanding of how other cultures are interpreting events. This is assuming that access to such functionality is even available.

As internet usage proliferates through an ever increasing number of countries and regions, more and more information and insight into various cultures and markets is becoming available. However, the data is stored in multiple languages and in a virtually limitless number of locations. Consequently, a substantial need exists for a portal that provides a single point of access to information from multiple cultures, countries, and languages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The claimed subject matter relates to multi-lingual information display in a single language portal. In accordance with various aspects of the claimed subject matter, a search engine component executes queries in several targets, and collects the results of the queries. The targets can include one or more continents, countries, regions, geographic areas, languages, cultures, economies, or markets. The search engine component provides for at least one full text search engine that allows distinction by the one or more targets of a query. Alternatively or additionally, the search component can include multiple search engines, wherein a distinct search engine is employed to execute the query in each target.

A machine translation engine component can translate search terms prior to the search engine component executing the query. The determination to translate the search terms prior to execution, and the desired language(s) of the translation, can be made by a user and/or an artificial intelligence component. Additionally, the machine translation engine component can translate the results of a query into a preferred user language or another language determined by the user and/or the system.

A display component renders the results of the query in a single view. The results of the query can be sorted according to one or more criteria, the criteria including but not limited to relevance, date, time, location, language, and logical order. Additionally, the display component can highlight the differences between the results. Any additional functionality included in a search engine used by the search engine component can be made available to the user via the display component.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention relates to a portal that provides a single point of access to information from multiple cultures, countries, and languages. In other words, a system and/or methodology for multi-lingual search and display. In particular, a multi-lingual search component executes queries in multiple targets, wherein the set of targets can include continents, countries, regions, geographic areas, languages, cultures, economies, markets, and so forth. Additionally, the multi-lingual search component can translate the query text prior to searching, and can translate the query results. The multi-lingual search component renders translated results in a single view.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Figure 1:
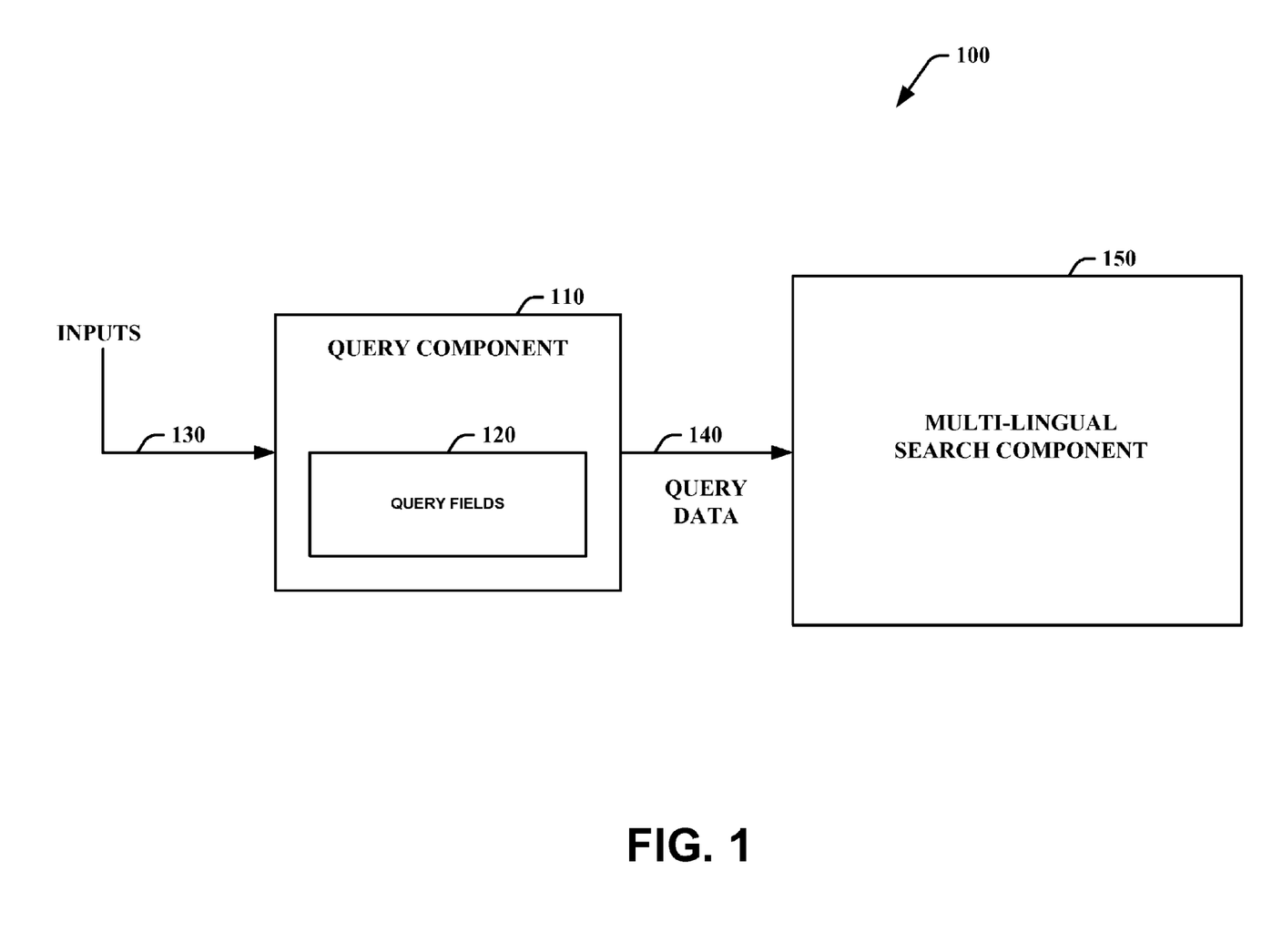
FIG. 1 is a general component block diagram illustrating a system for multi-lingual search and display in accordance with an aspect of the present invention.

Referring initially to FIG. 1, a multi-lingual search and display system 100 is illustrated in accordance with an aspect of the subject invention. The system 100 includes a query component 110 having one or more query fields 120. The query fields 120 can be determined from various inputs 130. The inputs 130 can include explicit user inputs (e.g., configuration selections, question/answer) such as from mouse selections, keyboard selections, speech, and so forth. Additionally, the query fields 120 can receive various types of inputs, including text, drop-down box selection, radio button selections, list selections, and so forth.

The query component 110 communicates a set of query data 140 to a multi-lingual search component 150. The query data 140 is based at least in part on the query fields 120. For example, the query data 140 can include one or more textual search terms and a set of targets in which the query should be executed. The multi-lingual search component 150 executes queries in multiple targets (e.g. set of targets). The set of targets can include one or more continents, countries, regions, geographic areas, languages, cultures, economies, markets and so forth. The multi-lingual search component 150 can execute the query in the set of targets with and/or without translating the query data 140 to the language(s) of the targets in which the query is to be executed. For example, the query could include a search term such as an individual's name or the name of business, wherein it may not be advantageous to translate the search term prior to searching. Additionally, after executing the query, the multi-lingual search component 150 collects the search results, and can translate the search results from the language of each target. The search results can be translated to any language within the multi-lingual search component's 150 capability, including a preferred language of the user. The preferred user language can be determined via the query fields 120.

Next, the multi-lingual search component 150 renders the translated results in a unified display (e.g. single view), wherein the results from multiple targets and various languages can be viewed together. Additionally, the results can be sorted based on one or more criteria, and the unified display can enable highlighting the differences between the results. Moreover, any additional functionality included in a search engine utilized by the multi-lingual search component 150 can be made available to the user through the unified display and incorporated into the system 100.

Figure 2:
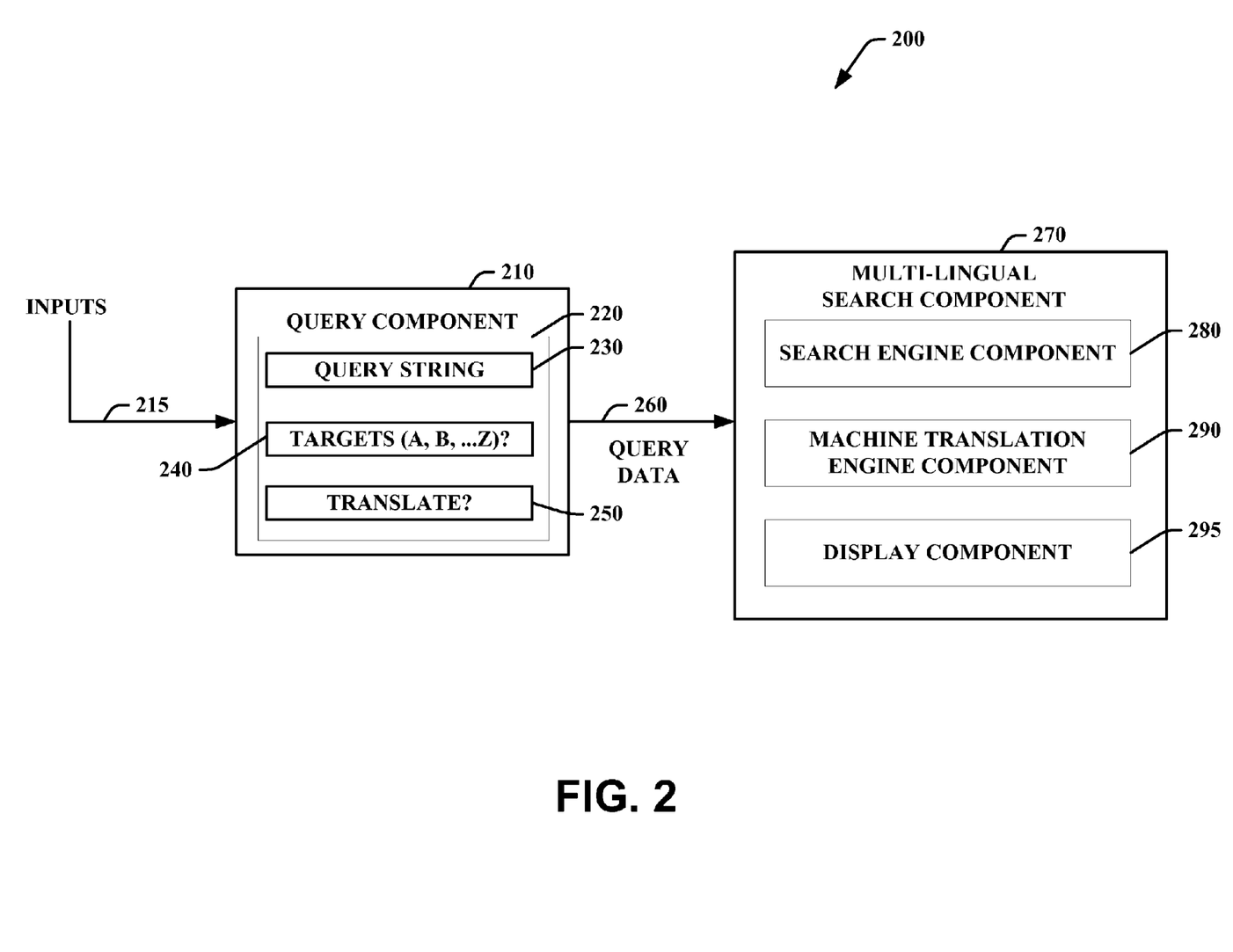
FIG. 2 is a general component block diagram illustrating a system for multi-lingual search and display in accordance with an aspect of the present invention.

Referring now to FIG. 2, a multi-lingual search system 200 is illustrated in accordance with an aspect of the subject invention. The system 200 includes a query component 210 having one or more query fields 220. The query fields 220 include but are not limited to a query string field 230, a targets field 240, and a translate field 250. The query fields 220 can be determined from various inputs 215. The inputs 215 can include explicit user inputs (e.g., configuration selections, question/answer) such as from mouse selections, keyboard selections, speech, and so forth. For example, the query string field 230 can receive one or more textual search terms from the inputs 215. The targets field 240 receives a value for one or more targets (e.g. a set of targets) in which queries using the textual search terms in the query string field 230 should be executed. The set of targets can include continents, countries, regions, geographic areas, languages, cultures, economies, markets and so forth. The translate field 250 receives a determination of whether the query strings 230 should be translated to the language of the targets prior to execution of the query. For example, the user may define the set of targets for the query by country (e.g. Germany, Japan, and Mexico), and determine to translate the query into the target languages (e.g. German, Japanese, and Spanish) prior to searching. Additionally, the system 200 may determine to translate the query into the target languages prior to searching based on a criteria, the criteria including but not limited to the existence of results above/below a predetermined threshold. The query component 210 determines a set of query data 260 based at least in part on the query fields 220.

The query data 260 is communicated to a multi-lingual search component 270 having a search engine component 280, a machine translation engine component 290, and a display component 295. The search engine component 280 provides for at least one full text search engine that allows distinction by the one or more targets 240 of a query. Alternatively or additionally, the search engine component 280 can include multiple search engines, wherein a distinct search engine is employed to execute the query against each target 240. The search engine component 280 is capable of processing the query data 260 in a variety of languages. The search engine component 280 can return abstracts and/or snippets of search results. The search results can be sorted based on one or more criteria, the criteria including relevance, date, time, location, language, and/or logical order.

The machine translation engine component 290 can translate text from each language of the search results. The search results can be translated to any language within the capability of the machine translation engine component 290, including a preferred language of the user. The preferred user language can be determined via the user or the system 200. Moreover, the machine translation engine component 290 can translate the query strings 230 to each language of the targets (e.g. target languages) prior to the search engine component 280 executing the queries. A determination to translate the query strings 230 can be made by the user via the translate field 250. Alternatively, the system 200 can determine to translate the query strings 230 prior to executing the search based at least in part on one or more criteria, the criteria including but not limited to the existence of results above or below a predetermined threshold.

The display component 295 renders the translated results in a unified display (e.g. single view), wherein the results from multiple targets and various languages can be viewed together. Additionally, the display component 295 can facilitate sorting the results based on one or more criteria, and the unified display can enable highlighting the differences between the results. Moreover, any additional functionality included in any search engine utilized by the search engine component 280 can be made available to the user through the unified display and incorporated into the system 200.

Figure 3:
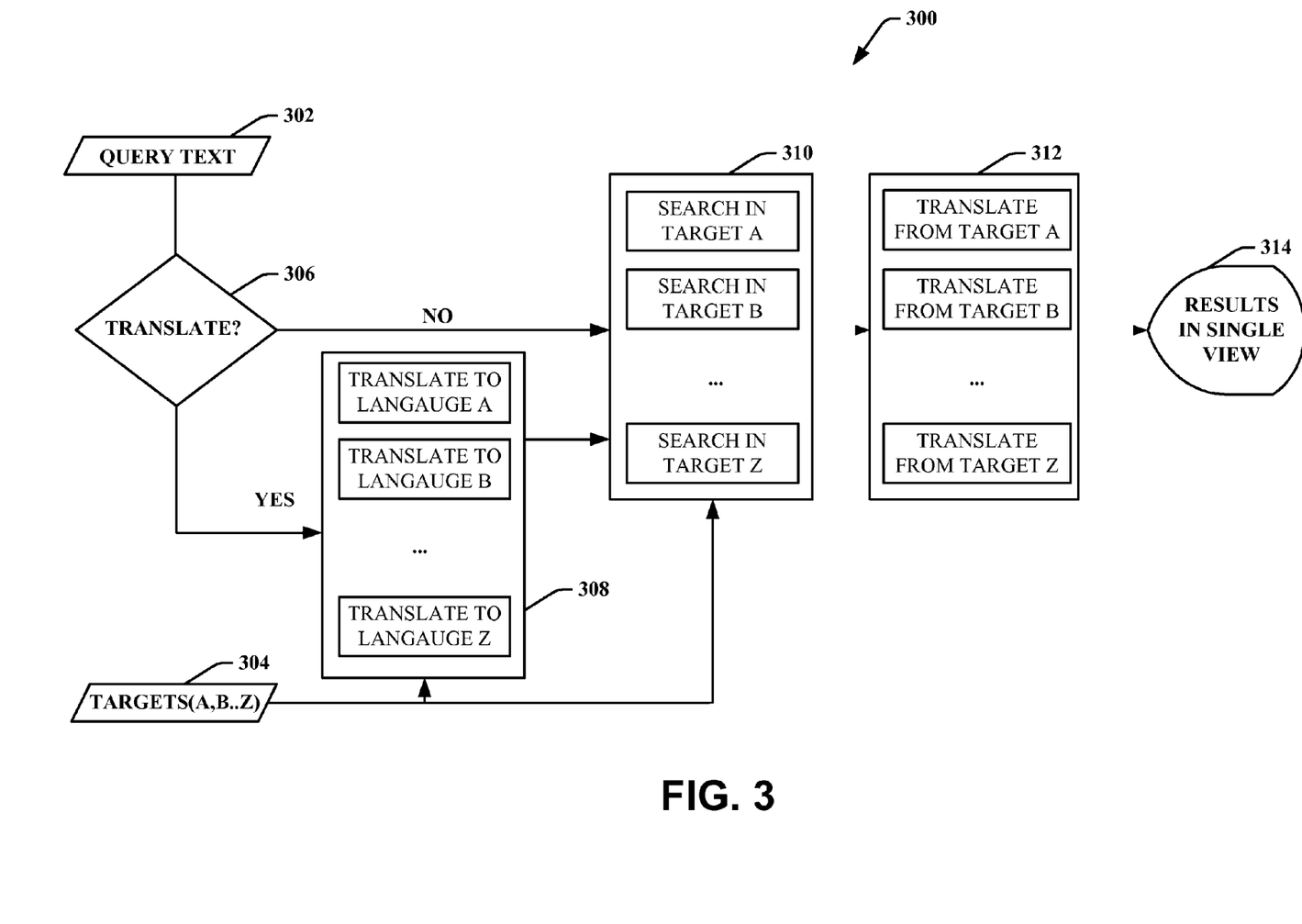
FIG. 3 is a flow chart illustrating a generalized methodology of multi-lingual search and display in accordance with the present invention.

Referring now to FIG. 3, example multi-lingual search and display aspects 300 are illustrated in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Before proceeding, it is noted that FIG. 3 illustrates a generalized process for executing queries in one or more targets, collecting the search results, translating the results, and rendering the results in a single view. It is to be appreciated, however, that the subject invention is not limited to the examples shown and can be applied to substantially any application that employs the generalized principles described in FIG. 3.

At 302, the system 300 receives one or more textual search terms (e.g. query strings) in a query text field. At 304, one or more targets (e.g. a set of targets) is received by the system 300. At 306, the system receives a determination of whether the textual search terms should be translated to the language(s) of the set of targets (e.g. target languages) prior to executing the query. The set of targets and the determination to translate the textual search terms to the target language(s) can be input by a user or can be determined by the system 300. For example, the user may enter one or more textual search terms, define the set of targets for the query by country (e.g. Germany, Japan, and Mexico), and determine that the textual search terms should be translated to the target languages (e.g. German, Japanese, and Spanish). Alternatively or additionally, the system 300 can define the set of targets based on the existence of results above a certain relevance threshold. The system 300 can also determine to translate the textual search terms to the target languages based on whether the original query produces results that exceed a certain threshold for each of the target languages.

If the textual search terms are to be translated to the target languages (e.g. YES at 306), then at 308 the textual search terms are translated to the target languages by the machine translation engine component prior to the search component executing the queries. At 310, the search component executes the query in the target using the translated textual search terms specific to that target. For example, the search component can conduct a search of Mexican websites using the query terms that have been translated to Spanish. It is appreciated that some targets may have one or more target languages. If is determined that the query strings should not be translated prior to executing the queries (e.g NO at 306), then the search engine component searches for the un-translated textual search terms in each of the targets at 310. For example, the search component can execute a search of Mexican websites using a set of initial textual search terms that were input in English.

At 312, the machine translation engine component translates text from each language of the search results back to the original query language, a preferred user language, or another language determined by the user and/or system 300. At 314 the display component renders the translated results in a unified display (e.g. single view). The results from one or more targets are displayed at a single point of access. Additionally, differences between the results can be highlighted, and the unified display can facilitate sorting the results based on one or more criteria.

Figure 4:
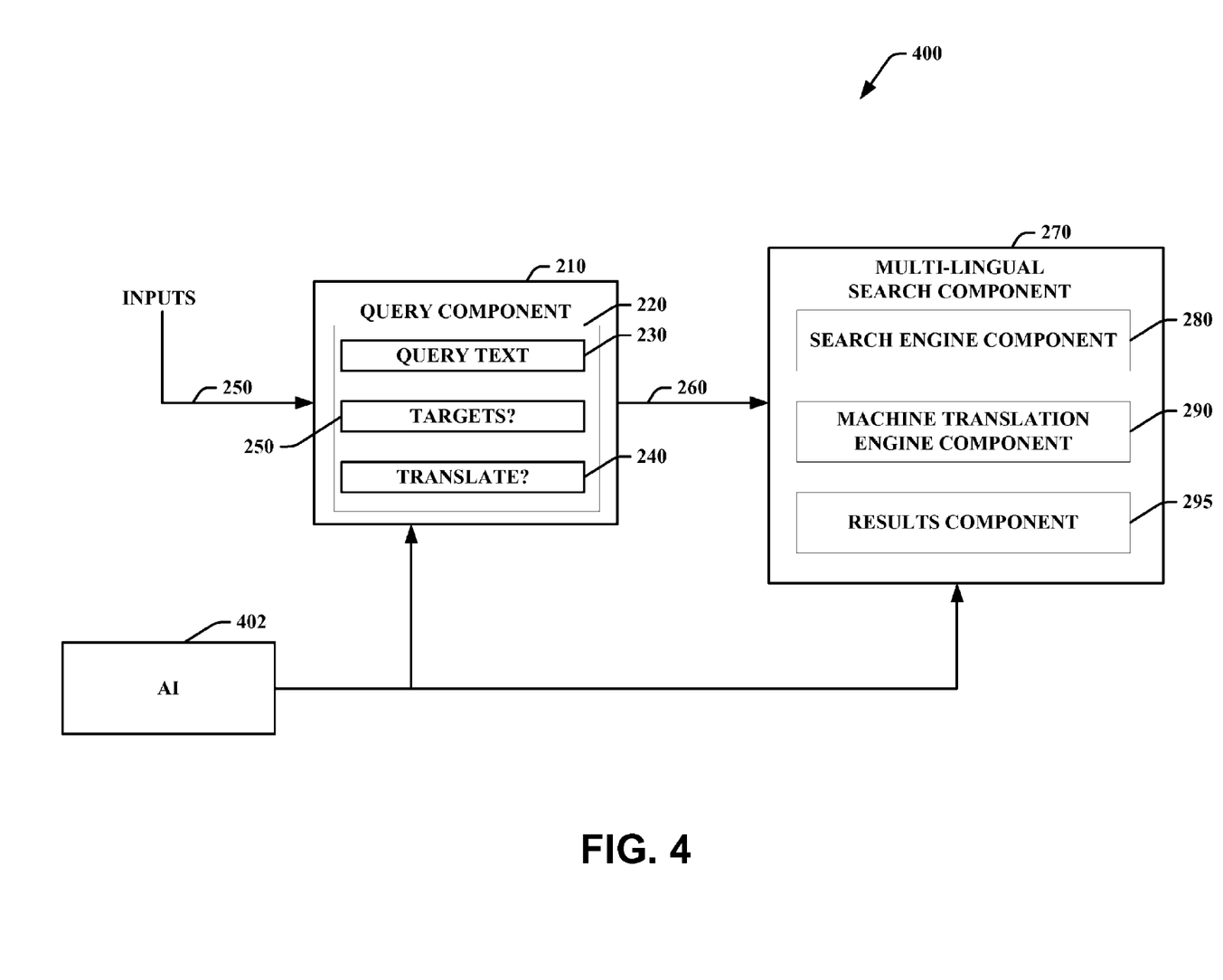
FIG. 4 illustrates a system that employs an artificial intelligence component which facilitates automating one or more features in accordance with the subject invention.

FIG. 4 illustrates a system 400 that employs an artificial intelligence (AI) component 402 which facilitates automating one or more features in accordance with the subject invention. The subject invention (e.g., in connection with inferring) can employ various AI-based schemes for carrying out various aspects thereof. For example, a process for determining whether to translate the search terms (e.g. query strings) to the target languages prior to executing the queries can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 5:
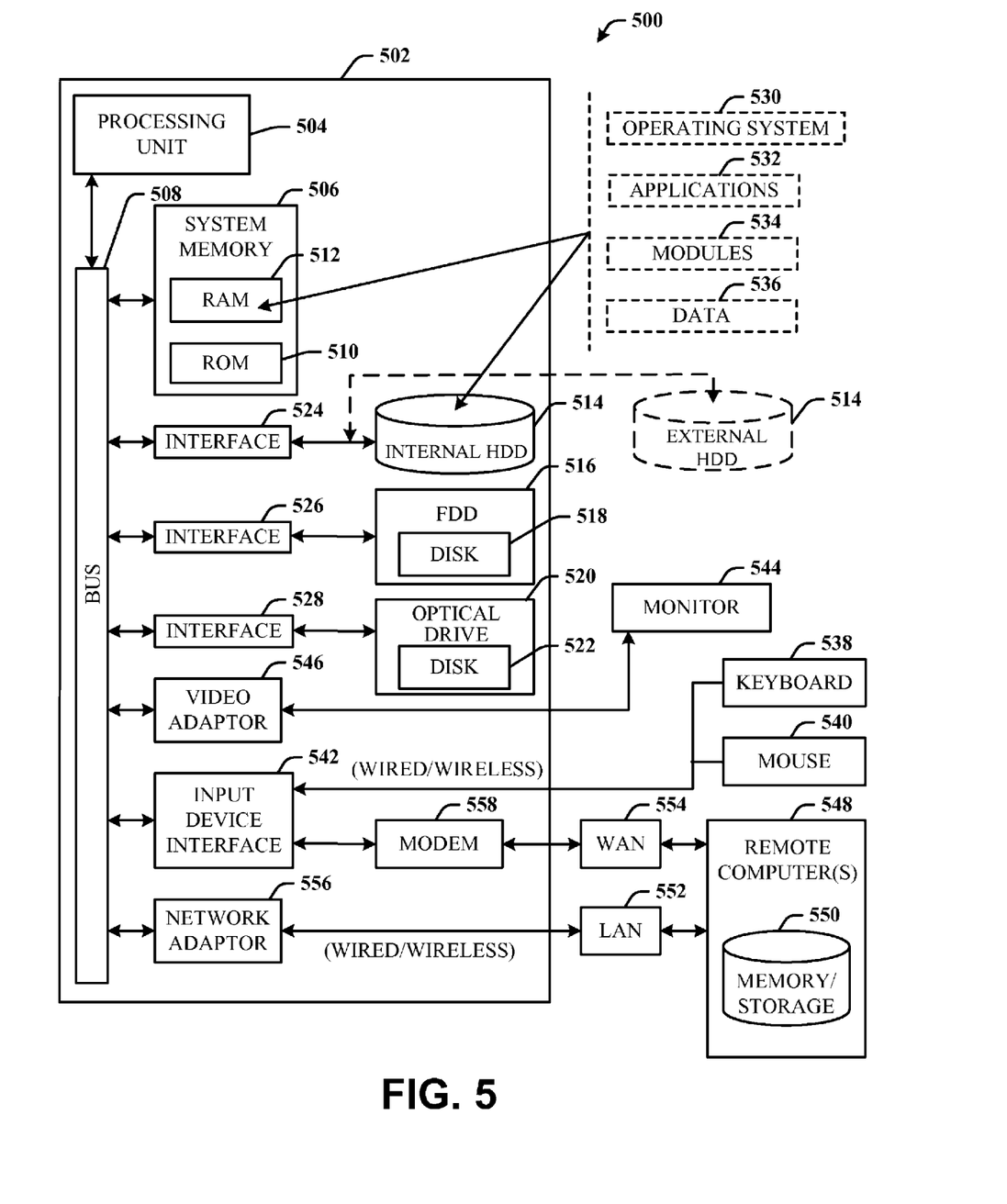
FIG. 5 is a schematic block diagram illustrating a suitable operating environment in accordance with an aspect of the subject invention.

Referring now to FIG. 5, there is illustrated a block diagram of a computer operable to execute the disclosed architecture. In order to provide additional context for various aspects of the subject invention, FIG. 5 and the following discussion are intended to provide a brief, general description of a suitable computing environment 500 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 5, there is illustrated an exemplary environment 500 for implementing various aspects of the invention that includes a computer 502, the computer 502 including a processing unit 504, a system memory 506 and a system bus 508. The system bus 508 couples system components including, but not limited to, the system memory 506 to the processing unit 504. The processing unit 504 can be any of various commercially available processors. Dual microprocessors and other multi processor architectures may also be employed as the processing unit 504.

The system bus 508 can be any of several types of bus structure that may further interconnect to a memory bus (with or without a memory controller), a peripheral bus, and a local bus using any of a variety of commercially available bus architectures. The system memory 506 includes read only memory (ROM) 510 and random access memory (RAM) 512. A basic input/output system (BIOS) is stored in a nonvolatile memory 510 such as ROM, EPROM, EEPROM, which BIOS contains the basic routines that help to transfer information between elements within the computer 502, such as during start-up. The RAM 512 can also include a high-speed RAM such as static RAM for caching data.

The computer 502 further includes an internal hard disk drive (HDD) 514 (e.g., EIDE, SATA), which internal hard disk drive 514 may also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The hard disk drive 514, magnetic disk drive 516 and optical disk drive 520 can be connected to the system bus 508 by a hard disk drive interface 524, a magnetic disk drive interface 526 and an optical drive interface 528, respectively. The interface 524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 512, including an operating system 530, one or more application programs 532, other program modules 534 and program data 536. All or portions of the operating system, applications, modules, and/or data can also be cached in the RAM 512. It is appreciated that the invention can be implemented with various commercially available operating systems or combinations of operating systems.

A user can enter commands and information into the computer 502 through one or more wired/wireless input devices, e.g., a keyboard 538 and a pointing device, such as a mouse 540. Other input devices (not shown) may include a microphone, an IR remote control, a joystick, a game pad, a stylus pen, touch screen, or the like. These and other input devices are often connected to the processing unit 504 through an input device interface 542 that is coupled to the system bus 508, but can be connected by other interfaces, such as a parallel port, an IEEE 1394 serial port, a game port, a USB port, an IR interface, etc.

A monitor 544 or other type of display device is also connected to the system bus 508 via an interface, such as a video adapter 546. In addition to the monitor 544, a computer typically includes other peripheral output devices (not shown), such as speakers, printers, etc.

The computer 502 may operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory storage device 550 is illustrated. The logical connections depicted include wired/wireless connectivity to a local area network (LAN) 552 and/or larger networks, e.g., a wide area network (WAN) 554. Such LAN and WAN networking environments are commonplace in offices, and companies, and facilitate enterprise-wide computer networks, such as intranets, all of which may connect to a global communication network, e.g., the Internet.

When used in a LAN networking environment, the computer 502 is connected to the local network 552 through a wired and/or wireless communication network interface or adapter 556. The adaptor 556 may facilitate wired or wireless communication to the LAN 552, which may also include a wireless access point disposed thereon for communicating with the wireless adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wired or wireless device, is connected to the system bus 508 via the serial port interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 6:
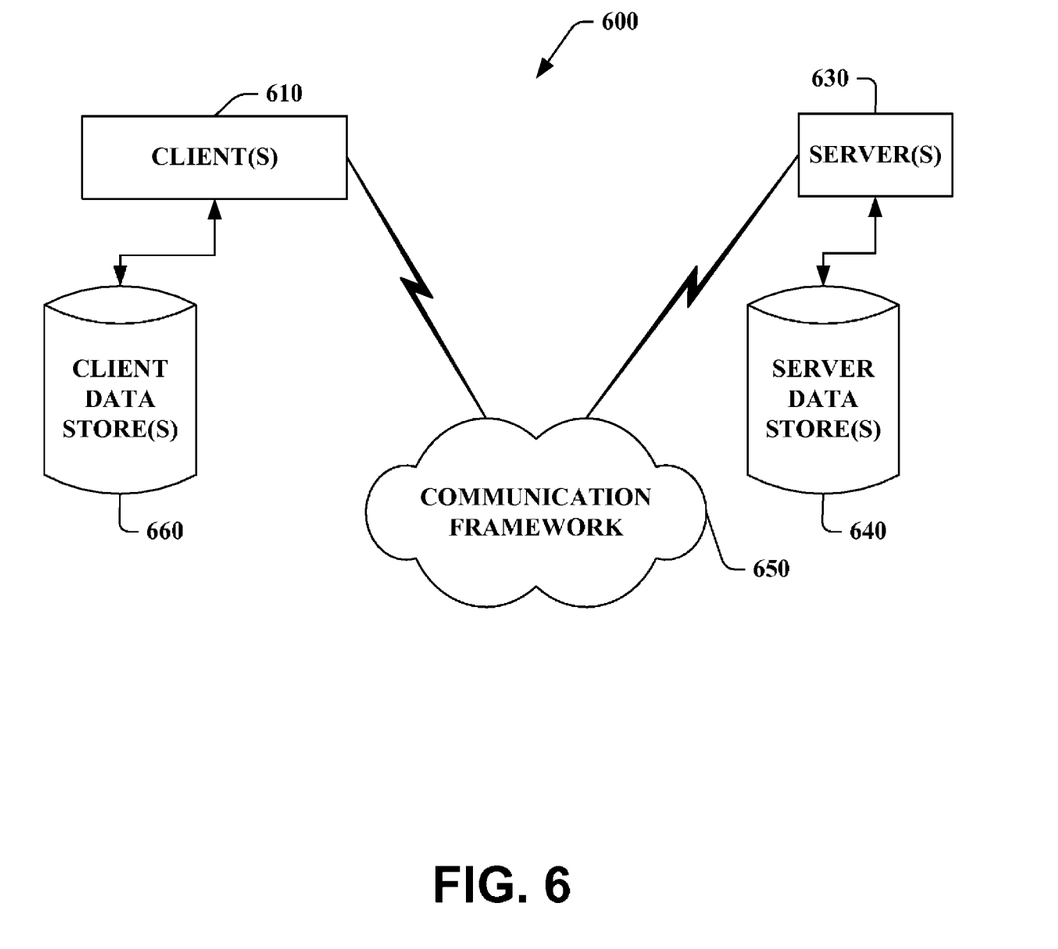
FIG. 6 is a schematic block diagram of a sample-computing environment with which the subject invention can interact.

Referring now to FIG. 6, there is illustrated a schematic block diagram of an exemplary computing environment 600 in accordance with the subject invention. The system 600 includes one or more client(s) 602. The client(s) 602 can be hardware and/or software (e.g., threads, processes, computing devices). The client(s) 602 can house cookie(s) and/or associated contextual information by employing the invention, for example.

The system 600 also includes one or more server(s) 604. The server(s) 604 can also be hardware and/or software (e.g., threads, processes, computing devices). The servers 604 can house threads to perform transformations by employing the invention, for example. One possible communication between a client 602 and a server 604 can be in the form of a data packet adapted to be transmitted between two or more computer processes. The data packet may include a cookie and/or associated contextual information, for example. The system 600 includes a communication framework 606 (e.g., a global communication network such as the Internet) that can be employed to facilitate communications between the client(s) 602 and the server(s) 604.

Communications can be facilitated via a wired (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-lingual search and display system, comprising:
a processor;
a search engine component that is operated by the processor to execute a plurality of queries in a plurality of targets, and collects the results of the queries;
a machine translation engine component that is operated by the processor to translate at least one of: at least one query string prior to execution by the search engine component, or the results, wherein the machine translation engine component translates the at least one query string from a first language to second and third languages or translates the results from the second and third languages to the first language, the first, second, and third languages being different languages; and
a display component that is operated by the processor to render the results in a unified display.

2. The system of claim 1, further comprising a query component that receives query data, the query data including at least one of: at least one query string, at least one target, or a determination to translate the query string to the target languages prior to the search engine component executing the query.

3. The system of claim 2, wherein the query component communicates the query data to the search engine component, and the search engine component executes the queries using the query data.

4. The system of claim 2, wherein the determination to translate the query string prior to execution by the search engine component is determined by at least one of: a user, or an artificial intelligence component.

5. The system of claim 1, wherein the search engine component and/or display component facilitates sorting the results according to at least one criteria.

6. The system of claim 1, wherein the display component facilitates highlighting differences between the results.

7. The system of claim 1, wherein the targets include at least one of a continent, a country, a region, a geographic area, a language, a culture, an economy, or a market.

8. A computer readable medium having stored thereon the components of the system of claim 1.

9. A method for multi-lingual search and display in a single portal, comprising:
    executing, by a computing device, queries in a plurality of targets;
    collecting, by the computing device, the results of the queries;
    translating, by the computing device, at least one of: the results, or at least one query string prior to executing the query in the targets, wherein the translating comprises translating the at least one query string from a first language to second and third languages or translating the results from the second and third languages to the first language, the first, second, and third languages being different languages; and
    rendering, by the computing device, the results in a cohesive display.

10. The method of claim 9, further comprising receiving at least one of: at least one query string, at least one target, or a determination to translate the query strings into the target languages prior to executing the queries.

11. The method of claim 10, further comprising executing the queries using at least one of: the query strings, the set of targets, or the determination to translate the query strings into the target languages prior to executing the queries.

12. The method of claim 9, wherein the targets include at least one of a continent, a country, a region, a geographic area, a language, a culture, an economy, or a market.

13. The method of claim 9, further comprising systematizing the results according to at least one criteria.

14. The method of claim 9, further comprising emphasizing dissimilarity between the results.

15. A computer readable medium having stored thereon the components of the system of claim 9.

16. A tangible computer-readable medium comprising executable instructions stored on the tangible computer-readable medium and configured to perform operations including:
    receiving query data, the query data comprising at least one query string, and at least one target;
    determining whether to translate the query strings to the target languages;
    executing a first query in a first target;
    executing a second query in a second target;
    collecting the results of the queries;
    translating at least one of: the query strings prior to executing the query, or the results, wherein the translating comprises translating the query strings from a first language to second and third languages or translating the results from the second and third languages to the first language, the first, second, and third languages being different languages; and
    rendering the translated results in a single view.

17. The tangible computer-readable medium of claim 16, wherein the operations further include organizing the translated results based at least in part on at least on a criteria, the criteria including relevance, date, time, location, language, and logical order.

18. The tangible computer-readable medium of claim 16, wherein the operations further include accentuating disparities among the results.

19. The tangible computer-readable medium of claim 16, wherein the determining whether to translate the query string to the target languages is based at least in part on artificial intelligence.

20. The tangible computer-readable medium of claim 16, wherein the targets include at least one of a continent, a country, a region, a geographic area, a language, a culture, an economy, or a market.

* * * * *